Oct. 20, 1931.  G. H. CLARK ET AL  1,828,395
RADIO COMPASS CORRECTING DEVICE
Filed March 19, 1921  2 Sheets-Sheet 1

Inventors
George H. Clark
George Y. Allen
By
Attorney

Oct. 20, 1931.  G. H. CLARK ET AL  1,828,395
RADIO COMPASS CORRECTING DEVICE
Filed March 19, 1921  2 Sheets-Sheet 2
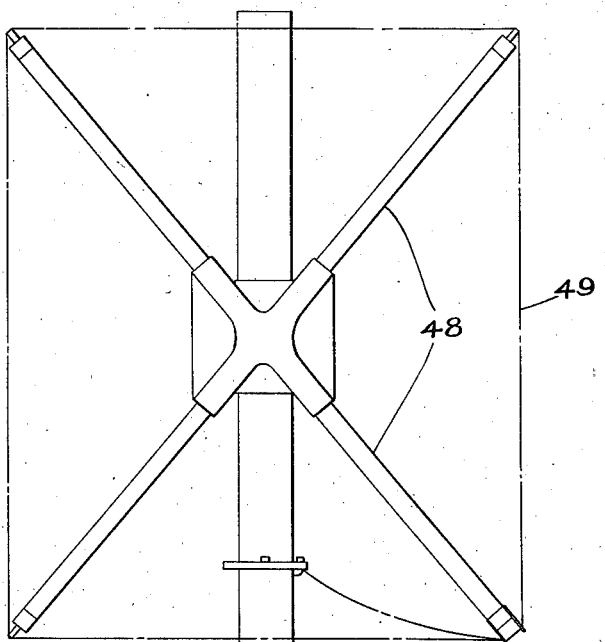
*Fig. 2*
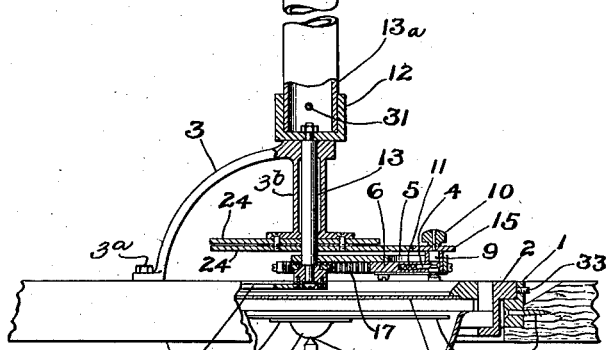
*Fig. 2ᵃ*
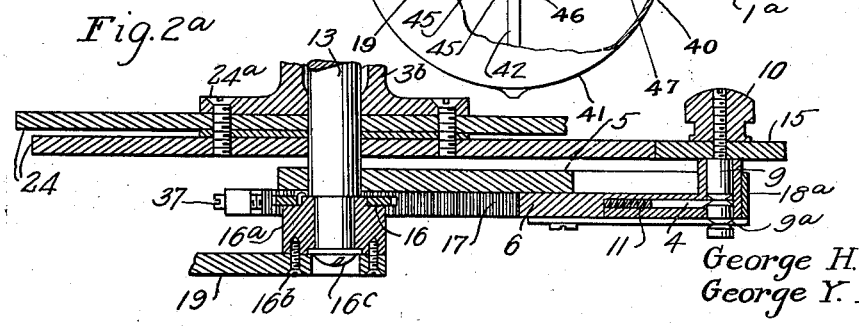
Inventor
George H. Clark
George Y. Allen
By
Attorney Patented Oct. 20, 1931

1,828,395

UNITED STATES PATENT OFFICE

GEORGE H. CLARK, OF NEW YORK, N. Y., AND GEORGE Y. ALLEN, OF PITTSBURGH, PENNSYLVANIA, ASSIGNORS TO RADIO CORPORATION OF AMERICA, A CORPORATION OF DELAWARE

RADIO COMPASS CORRECTING DEVICE

Application filed March 19, 1921. Serial No. 453,855.

Our invention relates generally to radio compass correcting devices, and has for an object to provide a mechanical attachment to be used in connection with a radio compass and a gyro-repeater or magnetic compass whereby the bearing as indicated by the radio compass is automatically corrected so that a correct indication is given on the gyro-repeater or magnetic compass.

A further object of our invention is to provide a device of this character by which the necessary corrections to the radio compass reading are applied mechanically thereby eliminating the possibility of error on the part of the operator in applying the corrections in the usual manner.

Further, as the corrected indication is given directly the loss of time resulting from reference to correction tables or curves, is avoided.

It is well known that the indicated reading of a radio compass does not agree with the true bearing of the transmitting station or ship, it being necessary to correct this reading for substantially the same reasons that it is necessary to correct for deviation the bearing given by a magnetic compass.

The necessary correction factors for all directions of incoming waves are determined by either "swinging ship" or by anchoring the ship and maintaining her on the same heading, while a boat equipped with a transmitter circles the ship. The transmitter is operated continuously and pelorus bearings are taken simultaneously with the radio compass bearings, and the difference between the actual and the indicated bearing gives a correction to be applied to the reading of the radio compass, and this correction varies, of course, with the angle that the incoming wave makes with the center line of the ship. Having determined this correction for various angles, it is usual to plot a curve showing actual bearings against radio compass bearings.

In the present practice it is necessary for the operator to take two bearings, one with respect to the true north and one with respect to the center line of the ship. Then by reference to a table or curve of corrections these readings are corrected, which operations not only require time but also provide a very strong possibility of error.

By the use of our radio compass correcting device, all corrections are automatically taken care of, and after setting the radio compass all that the operator has to do is to read the bearing from the dial of the gyro or magnetic compass as indicated by the index attached to the radio compass.

It is to be understood that our invention is adapted to and intended for use in connection with radio compasses both at shore stations and on ships.

We will now proceed to describe in detail the mechanism by which the corrections are automatically applied, reference being had to the annexed drawings in which:

Figure 2 is a vertical sectional view taken on line 2—2 of Figure 1, and shows the radio compass mounted over a magnetic compass, and Figure 2a is an enlarged sectional view partly broken away of part of the apparatus shown in Figure 2, while

Figure 1:
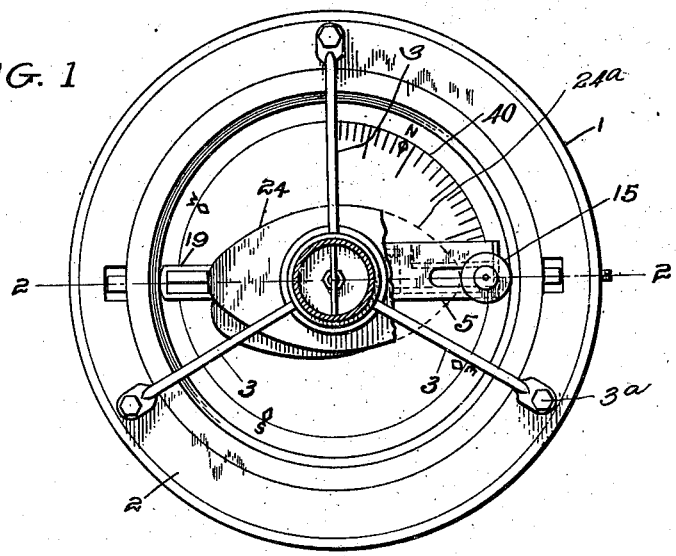
Figure 1 is a plan view of the entire apparatus with the exception of the radio compass, the radio compass shaft being in section.
Figure 3:
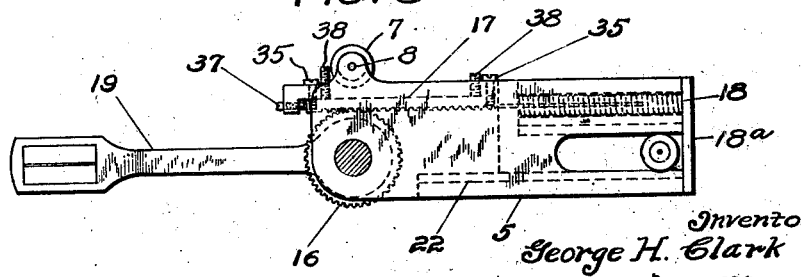
Figure 3 is a detail view of the index and guide arm together with the connecting mechanism.

A metal ring 1 is suitably mounted and retained by screws 1a so that its plane is perpendicular to and its center is in the same straight line as the shaft of the radio compass. Ring 1 receives and supports a second ring 2 in which is hung the compass having dial or compass card 40. The compass illustrated is an ordinary mariner's compass having a bowl 41, containing an antifreeze liquid, a pivotal support 42, a dial 40, magnets 44 and a flotation chamber 45 fixed to the card, the dial being pivotally mounted at 46, and a glass cover 47 for the bowl. Ring 2 is small enough to allow for a certain amount of adjustment of ring 2 with respect to ring 1 in any direction perpendicular to the radio compass shaft, the object of such adjustment being to facilitate bringing the center of shaft 13 in line with the center of the radio compass shaft. Once adjusted for a given installation, the relative positions of these two rings is rigidly maintained by means of set screws 33. This relative adjustment of the two rings also permits the lining up of the lubber points of the compass with the keel line of the ship. While I have illustrated a mariner's magnetic compass, a gyro compass or gyro repeater dial may be used in its place.

A frame 3 is rigidly attached to ring 2 by means of fasteners 3a in such a manner that shaft 13, which is carried thereby, is perpendicular to the plane of the magnetic or gyro card 40. The arms of the frame or support 3 which serves a double purpose in that it supports the shaft 13 and protects the compensating mechanism, are spaced to permit visual observation of the compass card and indicating member to be described later. Shaft 13 is rotatably mounted in frame 3 and rigidly attached to shaft 13 adjacent its lower end is a guide arm 5. The other end of shaft 13 is coupled in any suitable manner to the radio compass shaft 13a, whereby any angular displacement of the compass shaft 13a is transferred to the shaft 13 and to the guide arm 5. In the particular apparatus shown the rotative motion of the radio compass shaft is transferred directly to the correcting mechanism. It is obvious, however, that indirect methods may be designed to accomplish this purpose and it is, therefore, not our intention to be limited to any particular form of coupling.

The means which we have shown for coupling the shafts 13 and 13a consists of a cup 12 rigidly secured to shaft 13 by means of a nut 13b threaded on an extension 13c of shaft 13. The cup 12 is pinned to shaft 13a, as indicated by a pin 31. Guide arm 5, shaft 13, cup 12 and radio compass shaft 13a, all being connected together, turn as one unit, the angular position of the guide arm being the same for a given setting as that of the radio compass coil.

The under side of arm 5 is provided with ways 22 in which arm 6 slides in a radial direction. On one end of arm 6 is a rack 17 which engages a gear 16. The gear 16 is as shown in Figs. 2 and 2a mounted on an elongated ring or hollow shaft 16a which turns freely on the lower end of shaft 13. Rigidly attached to the shaft 16a by means of screws 16b is an index arm 19. The hollow shaft 16a gear 16 and arm 19 are rotatably retained on shaft 13 by means of a screw 16c. An adjustment of rack 17 is provided through the medium of screws 35, 37 and 38, in order that the position of index arm 19 may be adjusted within certain limits relative to the position of shaft 13 and 13a when the mechanism is assembled, and also that the rack may be set up close enough to gear 16 to prevent back lash. A roller 7 mounted on a pin 8 in an extension of the arm 5 rides on the member 6 to hold the rack 17 in engagement with the pinion 16.

Adjacent the outer end of arm 6 a boss is provided to slidably receive a shaft 9 carrying a roller 15 and knurled knob 10. Shaft 9 is provided with a plurality of grooves 9a. A finger 4 slidably carried by arm 6 is pressed by spring 11 into a selected one of the grooves. In this manner a vertical adjustment of shaft 9 is provided for. Spring 18 retained by member 18a in an opening in arm 5 abuts against and tends to force arm 6 to the limit of its travel toward the center of rotation of the system.

Frame 3 has rigidly attached thereto by means of screws 24a one or more elliptical cams 24. These cams, portions of which have been broken away in Figure 1 to show the roller 15 and arm 5 have the general form of ellipses as shown by the dotted line 24a of Figure 1. The roller 15 retained in the selected vertical position by means of pin 4 in one of the grooves 9a of shaft 9, is held in engagement with the outer periphery of the selected one of these cams by means of the above mentioned spring 18. Although each cam is correct for its own particular setting, all of the cams are roughly alike and of elliptical contour as shown in Figure 1 of the drawings.

It will be readily understood that if arm 6 is held fixed with respect to guide arm 5 and if shaft 13 be rotated, the index 19 will be rotated through the same angle as shaft 13. On the other hand, if shaft 13 is maintained stationary, a radial motion of arm 6 will impart an angular displacement to index 19. By providing a cam, therefor, the distance of the points of whose contour from the center bear a definite relation to the angular correction needed on the radio compass at each position, and by allowing the roller 15 to follow the contour of said cam, the index 19 will turn through an angle which will be the sum of the angle turned through by the radio compass coil, plus or minus the correction given by the cam.

The shaft 13a carries supports 48 for a coil of wire 49 acting as a collector of radio energy, and this coil may consist of one or more turns of wire as required to best suit the wave length range in which the compass is being used. The manner in which such coils are connected to radio receivers is well known, and not being a part of this invention, is not illustrated.

The distortion of a radio wave changes with the wave length and one cam is therefore correct only for the wave length for which it is made. A definite wave is usually assigned for radio compass work, and one cam can be made for this wave length. Other wave lengths may be taken care of by supplying any number of cams. We illustrate two cams and two possible positions of the roller whereby the latter may engage either of the cams.

The cams may be made by taking correction data at the shore station or aboard ship in the usual way, and by printing polar coordinates on cam blanks of suitable proportion, the correction data can be plotted directly on the blank and the cam can then be cut along this line.

The operation of the device is as follows:

As the radio compass is rotated to put the compass coil in its proper setting, the guide arm and index arm are rotated a like amount, so that so far, the index arm has the same position it would occupy if there was no correction to be applied. But as the guide arm rotates, the slide is caused to move radially, through the engagement of the roller with the periphery of the cam, and this radial movement of the slide causes a further rotary movement of the index arm, and it is this movement that automatically applies the correction, the amount of movement depending on the contour of the cam, and the contour being that of the plotted deviation curve.

While our invention has been particularly described in connection with use aboard ship, it is to be understood that it is not limited to such use, but is equally well adapted for shore stations.

Having fully described our invention what we claim as new and desire to secure by Letters Patent is:

1. The combination with a compass, a radio compass, an indicator, means for actuating said indicator from said radio compass to indicate on the first-named compass the bearing of an incoming radio signal, said means including means for applying to said indicator a correction in relative position to said radio compass in accordance with a predetermined error therein.

2. A rotatably mounted radio compass, an indicator rotatably attached thereto, means for altering the relative rotation of said radio compass and indicator in accordance with predetermined errors in said radio compass, and a scale member for determining the position of said indicator.

3. A support, a radio compass rotatably mounted thereon, a scale member, an indicator rotatable over said member and rotatably connected to said radio compass, a cam fixed to said support and shaped to compensate for errors in the indications of said radio compass, and means connected to said indicator and movable in contact with said cam to alter the relative rotation of said radio compass and said indicator in accordance with the shape of said cam.

4. A support, a radio compass rotatably mounted thereon, an indicator rotatably attached to said compass, a cam fixedly attached to said support having a shape corresponding to predetermined errors in said radio compass, means for altering the relative rotation of said radio compass, and said indicator in accordance with the shape of said cam, and a scale member for determining the position of said indicator.

5. A support, a radio compass rotatably mounted thereon, a cam fixedly attached to said support, a scale, and means for indicating on said scale the position of said radio compass as altered by the shape of said cam.

6. A support, a radio compass rotatably mounted thereon, a plurality of cams fixedly attached to said support, a scale, and means for indicating on said scale the position of said radio compass as altered by the shape of a selected one of said cams.

7. A support, a radio compass rotatably mounted thereon, an indicator rotatably attached to said compass, a plurality of cams fixedly attached to said support, means for altering the relative rotation of said radio compass and indicator in accordance with the shape of a selected one of said cams, means for placing the selected cam in operation, and a scale member for determining the position of said indicator.

8. In a radio compass, a rotatable member adapted to be turned toward a source of electromagnetic radiations, a rotatable indicator, and a compensating device interposed between the member and the indicator, whereby corrections may be applied to the indicator.

9. In an indicator, a pair of relatively movable elements, a movable directional radiant energy absorbing member mechanically connected to one of said relatively movable elements, and arranged to permit said element to take a corrected position, and a stationary correction device controlling the movement of one of said elements.

10. In an indicator for ships or the like to determine the bearing of an object, a rotatable element adapted to be moved to point apparently toward the object, another rotatable element, means constantly tending to cause relative rotation between said elements, and means controlling the amount of relative rotation whereby a correction may be applied to the position of the second rotatable element to compensate for the disturbing influence of the ship's mass.

11. Radio apparatus comprising an electrical system for effecting interchange of high frequency energy between itself and a natural medium and having a non-uniform directional characteristic, a member movable to position related to the wave front of said energy, a movable member in said electrical system, and means for varying the position of one of said members with respect to the other to compensate for wave front distortion.

12. In the art of receiving electro-radiant energy, the method which comprises absorbing from a natural medium electro-radiant energy in an electrical system having a non-uniform directional characteristic, moving a member of said system to position related to the apparent direction of propagation of said energy, moving an indicating member to a position dependent upon the position of said first named member, producing a form representative of wave front distortion, and modifying the movement of said indicating member in accordance with said form to effect compensation for departure of the apparent from the true direction of propagation of said energy.

13. In combination a directional antenna system, an indicator associated therewith for indicating the bearing of signaling currents in said system and means associated with said indicator for applying predetermined corrections to its readings.

14. In combination a directional antenna system, a movable member, means for moving said member in accordance with the bearing of signaling currents in said system and means for applying an additional corrective movement to said member.

15. In combination a directional antenna system, a movable member, means for moving said member in accordance with the bearing of signaling currents in said system and means associated with said first named means for automatically applying an additional corrective movement to said member.

16. In combination a directional antenna system, a movable member and means for moving it in accordance with the bearing of signaling currents in said system, a cam member and means coacting therewith and with said movable member for imparting a movement to the latter, whereby a composite movement may be imparted to the movable member governed partially by the bearing of signaling currents in said system and partially by the shape of said cam.

17. In combination a directional antenna system, a movable member and means for moving it in accordance with the bearing of a signaling current in said system, a cam member and means coacting therewith and with the movable member for automatically imparting an additional movement to said member in its movement to conform to the signal bearing.

18. In combination a directional antenna system, a movable member carrying an index, a scale coacting therewith, means for moving said member in accordance with the bearing of signals in said system and means for applying an additional corrective movement to said member.

19. In combination a directional antenna system, a movable member carrying an index, a scale coacting therewith, means for moving said member in accordance with the bearing of signals in said system and means operated by the movement of said member for automatically applying a predetermined corrective movement thereto determined by the signal bearing.

20. In combination a rotatable directional aerial whose position is subject to inherent errors, a movable member associated therewith and means for moving the latter in accordance with the movements of the former and means for automatically imparting an additional movement to the movable member to correct for the inherent errors in the position of the rotatable aerial.

21. In combination a rotatable directional aerial whose position is subject to inherent errors, a movable member associated therewith and means for moving the latter in accordance with the movement of the former, a cam member and means for moving said movable member to conform to the shape of said cam member, said cam member being so shaped as to correct the movement of the movable member for the inherent errors in the position of said rotatable aerial.

22. In combination a rotatable directional aerial whose position is subject to inherent errors, a movable member associated therewith and means for moving the latter in accordance with the movement of the former, said means comprising a cam member and means coacting therewith to automatically impart a corrective movement to the movable member to compensate for the inherent errors in the position of said rotatable aerial.

23. In combination a rotatable directional aerial whose position is subject to inherent errors, a movable member and means for moving the latter in accordance with the movement of the former, a cam member shaped to conform to the errors in position of the rotatable aerial and means coacting with the cam member and with the movable member to move the latter in accordance with the shape of the cam.

24. In combination a rotatable directional aerial whose position is subject to inherent errors, a movable member and means for moving the latter in accordance with the movement of the former, a cam member shaped to conform to the errors in position of the rotatable aerial and means coacting with the cam member and the movable member for selectively moving the latter to correct for the errors in position of said rotatable aerial as the movable member is moved in accordance with the movement of the rotatable aerial.

25. In a radio compass, a rotatable directional aerial, a rotatable indicator, and a compensating device operatively connecting the aerial to the indicator whereby corrections may be applied to the indicator.

26. In a radio compass, a rotatable directional radiant energy absorbing member, adapted to be turned toward a source of electromagnetic radiation, a rotatable indicator and a compensating device interposed between the radiant energy absorbing member and the indicator whereby corrections may be applied to the indicator.

27. In a radio compass, a rotatable directional aerial, an indicator connected with said aerial, and a compensating device operatively interposed between the aerial and said indicator, whereby corrections may be applied to the indicator.

28. In radio apparatus, a directional rotatable radiant energy absorbing member adapted to be turned toward a source of radiant energy, a rotatable indicator, and automatic compensating means operatively connecting said member and said indicator to correct the position of the latter.

29. In radio apparatus, rotatable directional radiant energy absorbing means, rotatable indicating means and compensating means connecting said energy absorbing means to said indicating means to automatically correct the position of the latter.

30. In combination a directional antenna, a movable member, means for imparting to said movable member movement substantially equal to the movement of said antenna and means operated by said first named means for automatically applying an additional corrective movement to said movable member.

31. A support, a rotatable member adapted to be turned apparently toward a source of electromagnetic radiation mounted thereon, a cam fixed to said support, a scale associated with said support and indicating means cooperating with said rotatable member and said scale and influenced by the shape of said cam to indicate on said scale the true direction of the radiation.

32. A support, a rotatable directional aerial mounted thereon, a cam fixed with respect to said aerial, a member attached to said aerial, movable means mounted on said member, anti-friction means mounted on said movable means, means for holding said anti-friction means in contact with said cam, an indicator and gearing means connecting said movable means to said indicator.

33. A support, a directional aerial mounted thereon, a cam fixed relative to said aerial, an arm fixed to said aerial, a movable member on said arm, a roller on said movable member, means for keeping said roller in contact with said cam, an indicator and connecting means between said indicator and said roller.

34. A support, a rotatable member adapted to be turned toward a source of electromagnetic radiation mounted thereon, a cam fixed relative to said rotatable member, an arm attached to said rotatable member, a slide mounted on said arm, anti-friction means on said slide, means for maintaining said anti-friction means in contact with said cam, an indicator, and gearing means between said slide and indicator.

35. In radio apparatus, a support, a rotatable directional aerial member mounted thereon, a plurality of cams fixed to said support, an arm attached to said rotatable member, a guide in said arm, a rack mounted in said guide, adjustable anti-friction means mounted on said rack, means for holding said anti-friction means in contact with a selected one of said cams, a pinion rotatably mounted on said rotatable member and meshing with said rack and an indicator fixed to said pinion.

36. In radio apparatus, a rotatable member whose position is subject to inherent errors, a cam coaxially located with respect to said rotatable member, an arm fixed to said rotatable member, a roller mounted on said arm, resilient means for holding said roller in contact with said cam, an indicator rotatably mounted on said rotatable member, and gearing means connecting said indicator to said roller in such a manner that said indicator takes a position corrected in accordance with the shape of said cam, relative to the position of said rotatable member.

37. In radio apparatus, a support, a rotatable directional aerial member mounted thereon, a plurality of cams fixed to said support and coaxially located with reference to said rotatable member, an arm attached to said rotatable member, a guide in said arm, a rack mounted in said guide, a roller adjustably mounted on said rack, resilient means for holding said roller in contact with a selected one of said cams, a pinion rotatably mounted on said rotatable member, and meshing with said rack, an indicator fixed to said pinion, and a scale coaxially located with respect to said pinion.

38. In combination a rotatable directional aerial whose pointing position is subject to inherent errors, an indicator mounted for rotation about the axis of said directional aerial, a cam mounted on said support, an arm fixed to said aerial, and automatic compensating means operatively interposed between said arm and said indicator and influenced by the shape of said cam to impart to said indicator the motion of said aerial plus an additional corrective movement determined by the shape of said cam.

39. In radio apparatus, a support a shaft mounted for rotation therein, a loop aerial mounted on said shaft, a plurality of cams fixed to said support, an arm fixed to said shaft, a rack slidably mounted on said arm, a roller adjustably mounted in said rack and adapted to be held in contact with one of said cams, a pinion rotatably mounted on said shaft meshing with said rack and an indicator fixed to said pinion.

40. A support, a shaft rotatably mounted in said support, a directional aerial mounted on said shaft, an indicator mounted on said shaft and normally adapted to rotate therewith, and compensating means interposed between said shaft and said indicator and adapted to impart an additional movement to said indicator.

41. A radio compass comprising a rotatable member adapted to be turned to position related to the direction of a source of electro-radiant energy, an indicator, and a device for automatically compensating for wave front distortion, whereby said indicator takes a position corresponding with the true direction of said source of electro-radiant energy.

42. A radio compass comprising a rotatable member adapted to be turned to position related to the direction of a source of electro-radiant energy, an indicator, and a device for automatically compensating for wave front distortion interposed between said rotatable member and said indicator whereby said indicator takes a position corresponding with the true direction of said source of electro-radiant energy.

43. A radio compass comprising a rotatable member adapted to be turned to position related to the direction of a source of electro-radiant energy, an indicator, and a device for compensating for wave front distortion for different positions of said rotatable member including a correction member on said rotatable member movable relatively to a fixed member, whereby said indicator indicates true direction of said source of electro-radiant energy.

44. The combination with a radio compass comprising a rotatable direction-finding coil and a direction indicator, of a device for compensating for wave front distortion to effect indication of true direction of a source of electro-radiant energy by said indicator including a fixed correction member and a correction member mounted on said shaft movable relatively to said fixed member, the magnitude of the correction depending upon the relative position of said correction members.

45. In radio apparatus, a shaft, a frame aerial adapted to be turned to position related to the direction of a source of electro-radiant energy carried by said shaft, an indicator coaxially mounted with respect to said shaft, and a device for compensating for wave front distortion for different positions of said rotatable member including a fixed member and a member on said shaft adapted to be moved relative to said fixed member, whereby said indicator indicates true direction of said source of electro-radiant energy.

46. In a radio compass, means adapted to be rotated to point to a source of radiant energy, a rotatable member coaxially arranged with the first mentioned means, means tending to cause relative rotation of the two rotatable members, and means controlling the amount of relative rotation operated in accordance with the position of one of the members relative to the ship.

47. In an indicator, a pair of rotatable, coaxially mounted members, a frame aerial carried by one of said members, a guide radial to the axis of the members and carried by one of them, a member slidably mounted in said guide, means tending to slide this member to cause relative rotation between the rotatable members, and a stationary cam limiting the extent to which the member may be slid.

48. Radio loop aerial apparatus, which includes a movable loop aerial, a member connected with said loop; a movable member, compensating mechanism connected between the two members to permit their simultaneous movement at dissimilar rates; and a bearing-indicator carried by said last named member.

49. In the art of receiving electro-radiant energy, the method which comprises absorbing from a natural medium electro-radiant energy in an electrical system having a non-uniform directional characteristic, moving a member of said system to position related to the apparent direction of propagation of said energy, moving an indicating member to a position dependent upon the position of said first named member, and imparting to said indicating member an additional increment of movement for compensating for departure of the apparent from the true direction of propagation of said energy.

50. In indicating apparatus inherently subject to varying pointing errors, a rotatable member, radiant energy interchange means connected to said rotatable member, a member rotatable with respect to said first named member, an indicator connected to said last named member, mechanism connecting said rotatable members for relative rotation, said mechanism being adapted on rotation of said rotatable members to vary in position through a range sufficient to allow a point on said mechanism, the position of which determines the relative position of said rotatable members, to follow a potential closed path, and means representative of the pointing errors for forcing said point to follow a predetermined closed path.

51. In indicating apparatus inherently subject to varying pointing errors, a rotatable member, radiant energy interchange means connected to said rotatable member, a member rotatable with respect to said first named rotatable member, an indicator connected to said last named member, mechanism connecting said rotatable members for relative rotation, said mechanism being adapted on rotation of said rotatable members to vary in position through a range sufficient to allow a point on said mechanism, the position of which determines the relative position of said rotatable members, to follow a potential recurring path, and an element representative of the pointing errors for forcing said point to follow a recurring path of varying radius.

52. In indicating apparatus inherently subject to pointing errors which vary substantially sinusoidally, a rotatable member, radiant energy interchange means connected to said rotatable member, a member rotatable with respect to said first named rotatable member, an indicator connected to said last named member, mechanism connecting said rotatable members for relative rotation, said mechanism being adapted on rotation of said rotatable members to vary in position through a range sufficient to allow a point on said mechanism, the position of which determines the relative position of said rotatable members, to follow an elliptical path, and an element forcing said point to follow a path substantially elliptical.

53. In apparatus to be used with frame aerials inherently subject to pointing errors, an elliptical cam, and means associated with said aerial and said cam for applying corrections to the pointing position of said frame aerial which vary in accordance with the contour of said cam.

54. In a radio compass, a frame, coaxial shafts mounted in and extending from said frame, means tending to cause relative rotation between said shafts, a coil movable by one of said shafts, an indicating member movable by the other of said shafts, and means within said frame controlling the extent of relative rotation of said shafts.

55. In a radio compass, a frame, a pair of coaxially mounted shafts accessible from the exterior of said frame, means tending to cause relative rotation of said shafts, a coil mounted for rotation by one of said shafts, an indicating member secured to the other of said shafts, and means within said frame to limit the extent of relative rotation of said shafts.

56. In radio apparatus, a frame, a compass card, a shaft of appreciable length rotatably mounted in said frame, a coil on said shaft spaced from said frame, an indicator adjacent said compass card, a rotatable member carrying said indicator, mechanism within said frame connecting said shaft and said rotatable member for substantially equal rotation, and means within said frame cooperating with said mechanism to impart to said rotatable member an additional corrective movement.

GEORGE H. CLARK.
GEORGE Y. ALLEN.